United States Patent
Emelyanov et al.

(10) Patent No.: US 11,216,343 B1
(45) Date of Patent: Jan. 4, 2022

(54) SYSTEM AND METHOD FOR ACCELERATING PROCESSING IN EVENT-DRIVEN SERVER-LESS COMPUTING

(71) Applicant: Virtuozzo International GmbH, Schaffhausen (CH)

(72) Inventors: Pavel Emelyanov, Moscow (RU); Alexey Kobets, Seattle, WA (US); Mikhail Philippov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 22 days.

(21) Appl. No.: 16/051,954

(22) Filed: Aug. 1, 2018

(51) Int. Cl.
G06F 11/14 (2006.01)
G06F 9/445 (2018.01)
G06F 9/455 (2018.01)

(52) U.S. Cl.
CPC ...... *G06F 11/1464* (2013.01); *G06F 9/44578* (2013.01); *G06F 9/45558* (2013.01); *G06F 11/1451* (2013.01); *G06F 11/1484* (2013.01); G06F 2009/45575 (2013.01); G06F 2201/815 (2013.01); G06F 2201/84 (2013.01)

(58) Field of Classification Search
USPC ....................................................... 718/100
See application file for complete search history.

(56) References Cited

U.S. PATENT DOCUMENTS

| | | | |
|---|---|---|---|
| 6,795,966 B1* | 9/2004 | Lim ................... | G06F 11/1438 718/1 |
| 7,627,728 B1* | 12/2009 | Roeck .................. | G06F 11/203 711/162 |
| 8,166,477 B1* | 4/2012 | Tormasov ............. | G06F 9/4418 718/1 |
| 8,984,510 B1* | 3/2015 | Emelianov .......... | G06F 9/45558 718/1 |
| 9,465,518 B1* | 10/2016 | Koryakina ............ | G06F 3/0482 |

(Continued)

OTHER PUBLICATIONS

John Cook; "Random Number Generator Seed Mistakes"; johndcook.com blog page [full url in ref.]; Jan. 29, 2016 (Year: 2016).*
(Continued)

*Primary Examiner* — Wei Y Zhen
*Assistant Examiner* — Clint Thatcher
(74) *Attorney, Agent, or Firm* — Arent Fox LLP; Michael Fainberg

(57) ABSTRACT

Disclosed are systems and methods for execution of applications in a virtual execution environment. An exemplary method comprises receiving from a client, a request for execution of an application in at least one virtual execution environment on at least one hardware node, determining whether there is a state snapshot of an application in the virtual execution environment, restoring a state of the application from a state snapshot in the virtual execution environment when the state snapshot of the application is found, starting the application without restoring the state of the application from the state snapshot and creating a new state snapshot of the application when the state snapshot of the application is not found, continuing execution of the application in the virtual execution environment and returning a response of the application to the client.

21 Claims, 11 Drawing Sheets

(56) References Cited

U.S. PATENT DOCUMENTS

| | | | | |
|---|---|---|---|---|
| 9,535,907 | B1* | 1/2017 | Stringham | G06F 11/1435 |
| 10,114,705 | B1* | 10/2018 | Kumar | G06F 11/1469 |
| 2009/0144515 | A1* | 6/2009 | Benari | G06F 11/1471 |
| | | | | 711/162 |
| 2015/0046921 | A1* | 2/2015 | Allen | G06F 3/067 |
| | | | | 718/1 |
| 2015/0378831 | A1* | 12/2015 | Tarasuk-Levin | G06F 11/1484 |
| | | | | 714/15 |
| 2019/0391809 | A1* | 12/2019 | Leidal | G06F 9/5027 |

OTHER PUBLICATIONS

Zhu et al.; "Twinkle: A fast resource provisioning mechanism for internet services," 2011 Proceedings IEEE Infocom (pp. 802-810); 2011 (Year: 2011).*

Yamakita et al.; "Phase-based reboot: Reusing operating system execution phases for cheap reboot-based recovery," 2011 IEEE/IFIP 41st International Conference on Dependable Systems & Networks (DSN) (pp. 169-180); 2011 (Year: 2011).*

\* cited by examiner

SYSTEM AND METHOD FOR ACCELERATING PROCESSING IN EVENT-DRIVEN SERVER-LESS COMPUTING

FIELD OF TECHNOLOGY

The present disclosure relates generally to the field of cloud computing and, more specifically, to systems and methods for accelerating processing in event-driven server-less computing.

BACKGROUND

Cloud providers have increasingly begun providing "server-less" computing to application developers that allow the developers to build and run applications and services without worrying about starting, configuring, and managing any servers. In general, server-less computing accommodates any type of application or backend service and allows for application scaling with high availability, all handled by the provider without developer involvement. Server-less architecture allows for applications that depend on custom code that is run on a back-end service (e.g., a cloud platform), often in an execution container. A piece of executable code (e.g., a "Lambda") sits in the container and is triggered in response to events on a client device, such as a mobile phone, laptop, or even another cloud service. The code executes and returns a response to the application without the developer having to be concerned with management of the container and server on which the code executes.

Cloud providers also allow companies to use one or more virtual machines which virtualize the hardware resources of underlying hardware devices. Multiple execution containers can be used in each of these virtual machines, making it significantly easier for clients to offload business logic to the cloud. Clients of these execution containers include Internet of Things (IoT) devices, mobile phones, laptops, servers and other devices.

However, existing implementations are inefficient because execution containers take time to initialize themselves, and then more time to initialize and start application interpreters, dependencies and the like on the container.

Therefore, there is a need in the art for a system and method for accelerating processing in event-driven server-less computing.

SUMMARY

Systems and methods are disclosed herein for execution of applications in a virtual execution environment.

An exemplary method comprises receiving from a client, a request for execution of an application in at least one virtual execution environment on at least one hardware node, determining whether there is a state snapshot of an application in the virtual execution environment, restoring a state of the application from a state snapshot in the virtual execution environment when the state snapshot of the application is found, starting the application without restoring the state of the application from the state snapshot and creating a new state snapshot of the application when the state snapshot of the application is not found, continuing execution of the application in the virtual execution environment and returning a response of the application to the client.

In one aspect of the method, starting the application without restoring the state of the application from the state snapshot further comprises preparing the application for processing the request and, wherein continuing execution of the application in the virtual execution environment further comprises processing the request by the application.

In one aspect of the method, preparing the application further comprising at least one of loading application executables, loading application dependencies, initializing variables, performing code preprocessing.

In another aspect of the method, preparing the application when the application comprises a binary, further comprising loading a runtime environment for the binary and loading binary dependencies in the virtual execution environment.

In one aspect of the method, preparing the application when the application comprises an interpreter, further comprises loading interpreter executable, loading interpreter libraries, initializing the interpreter, and preprocessing the set of instructions.

In one aspect of the method, restoring the state of the application from the state snapshot further comprises re-initializing a portion of the variables.

In one aspect of the method, when the application comprises an interpreter, re-initializing comprises re-seeding random number generators already instantiated by the interpreter in the state snapshot.

In one aspect of the method, the application is one of a set of instructions written in an interpreted language along with an interpreter configured to execute the set of instructions or a precompiled binary created from a set of instructions.

In one aspect of the method, a process associated with the application is killed when the response is sent.

In one aspect of the method, the virtual execution environment is an execution container.

In one aspect of the method, executing the application on the virtual execution environment comprises interpreting a source code of the application and performing operations based on the source code of the application.

In one aspect of the method, the state snapshot is stored as an image file on disk storage, and restoring a state of the application from a state snapshot further comprises loading at least one page from the image file to the memory associated with the application, restoring of at least one kernel object of at least one process associated with the application.

In one aspect of the method, the state snapshot is stored as an image file on disk storage, and restoring the state of the application from the state snapshot further comprises writing all data from the image file to a memory of the process associated with the application.

In one aspect of the method, the state snapshot is stored as an image file on disk storage, the method further comprising during execution of the application, inspecting a memory of the application and creating a map indicating which pages of the memory have been accessed, during later restoration of the state of the application, comparing pages in the image file to pages in the map, writing a portion from the image file to the memory of the application, the portion corresponding to pages in both the image file and the map and writing other portions from the image file to the memory of the application only after the application attempts to access information stored in the other portions.

In one aspect of the method, the state snapshot is stored as an image file on disk storage, and further comprising writing a portion from the image file to a memory of the application only when the application attempts to access information stored in the portion of data.

In one aspect of the method, the state snapshot is stored as an image file on disk storage, and further comprising tracking attempts to access pages in the image file that are not restored in the memory and loading the pages from the image file to the memory.

In one aspect of the method, the state snapshot is stored as an image file on disk storage, and further comprising mapping the image file to memory, detecting an attempt to access an identified portion of the memory and loading the identified portion from the mapped image file to the memory.

In one aspect, an exemplary system comprises a hardware processor configured to: receive from a client, a request for execution of an application in at least one virtual execution environment on at least one hardware node, determine whether there is a state snapshot of an application in the virtual execution environment, restore a state of the application from a state snapshot in the virtual execution environment when the state snapshot of the application is found, start the application without restoring the state of the application from the state snapshot and creating a new state snapshot of the application when the state snapshot of the application is not found, continue execution of the application in the virtual execution environment and return a response of the application to the client.

In one aspect, a non-transitory computer-readable medium is provided, storing instructions thereon comprising receiving from a client, a request for execution of an application in at least one virtual execution environment on at least one hardware node, determining whether there is a state snapshot of an application in the virtual execution environment, restoring a state of the application from a state snapshot in the virtual execution environment when the state snapshot of the application is found, starting the application without restoring the state of the application from the state snapshot and creating a new state snapshot of the application when the state snapshot of the application is not found, continuing execution of the application in the virtual execution environment and returning a response of the application to the client.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for accelerating processing in event-driven server-less computing. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms are used throughout the specification, drawings and claims.

A Virtual Execution Environment (VEE) is a type of environment that supports program code execution, where at least a part of the real hardware or software utilized for running program code are presented as their virtual analogs. From the point of view or the user, that the code in VEE runs as if it were running on the real computing system. Examples of VEEs can be any kind of virtual machines (VMs, including lite VMs), containers (including OS containers, stateless containers, or execution containers), and the like.

A Virtual Machine (VM) is a type of an isolated VEE running on the same physical machine simultaneously, wherein hardware resources are virtualized. Each Virtual Machine instance executes its own OS kernel. Support of Virtual Machines is implemented using a Virtual Machine Monitor and/or a Hypervisor.

A container (CT) is one type of a Virtual Execution Environment running on the same hardware system, where containers share operating system (OS) kernel and at least some of the system resources, and where isolation of containers is implemented on the namespace level. In some aspects, container is defined as an isolated namespace. In some aspects, multiple sets of application services are organized on a single hardware system by placing them into isolated containers.

Execution containers (a type of containers) are generally defined as isolated namespaces, or self-contained environments that allow an application to execute. Such containers often include binaries, runtime libraries, system tools, code interpreters and system packages. An application in an execution container is able to run independently of the influence of other applications in an isolated environment.

According to one aspect of the disclosure, an application refers to a set of instructions written in an interpreted language and an interpreter which executes it. In another aspect, (e.g., in the case of a compiled language) an application refers to a precompiled binary created from a set of instructions.

Figure 1A:
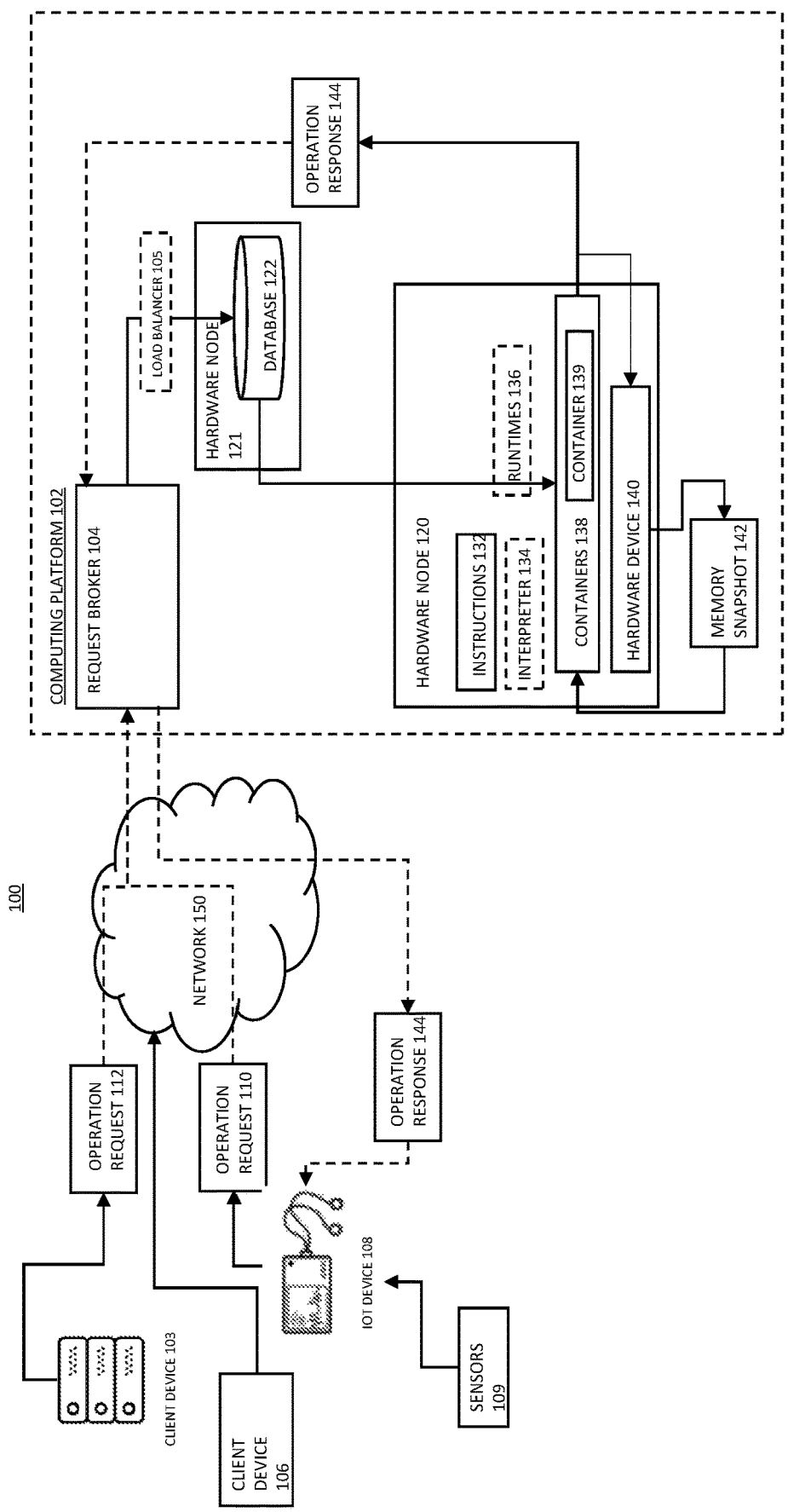
FIG. 1A illustrates a block diagram of an exemplary architecture for an event-driven server-less computing system according to one aspect of the disclosure.

FIG. 1A illustrates a block diagram of an architecture for an event-driven server-less computing system 100 according to one aspect of the disclosure.

In one example aspect, the system 100 comprises computing platform 102. Several client devices such as client device 103, client device 106 and Internet-of-Things device (IoT) 108, all collectively referred to as client devices, communicate with the computing platform 102 via a network 150. The IoT device 108 can be any type of internet-of-things device and may include or communicate with one or more sensors 109 (temperature, pressure, or the like). In some instances, the IoT device 108 can control actuators through feedback from multiple sensors that generate many events. Similarly, any of the client devices may be mobile devices, laptops, computers, tablets, servers, cloud environments, other cloud services, other execution containers or the like. The network 150 may be the Internet, or a network that is local to the client devices or remote from the client devices. In one aspect, the client devices 103-108 may generate or cause an event that triggers the execution of (e.g., Lambda) instructions contained in the computing platform 102. The computing platform 102 returns a response to a client after execution of the instructions are complete. In order to accelerate the processing of the instructions, the computing platform 102 includes a component that saves and restores states (using checkpoint images, also called state snapshots) of various portions of the computing platform 102. For example, a checkpoint/restore in user space (CRIU) component can be used for saving and restoring a state of a running application. Various improvements are described with respect to FIGS. 2A-6 discussed below.

In one exemplary aspect, the computing platform 102 comprises a request broker 104, a hardware node 120 and hardware node 121. In one aspect, the request broker 104 listens for and detects events (e.g., using a communication channel with client) and when an event occurs, the request broker 104 navigates through a database on hardware node 121 of (e.g., Lambda) events and finds the proper set of instructions (e.g., Lambda function) to execute in a virtual execution environment (VEE). The request broker 104 requests a micro-service to run the set of instructions (e.g., Lambda function) by selecting or creating a VEE on the hardware node 120. The VEE runs the micro-service, which executes the set of instructions (e.g., Lambda function), then a response is returned (e.g., by broker 104) to the client. Subsequently, the VEE may be deleted, or stored in a resource pool for future access, according to some aspects of the disclosure. In some aspects, a virtual machine (VM) can also be used instead of the VEE, or the VEE may be a container.

The hardware node 120 may be a single hardware server, in one aspect, that further comprises a plurality of VEEs such as execution containers 138 each associated with one or more instructions (e.g. Lambda functions, also referred to as Lambdas or applications) 132, their interpreters 134 and/or runtimes 136. The hardware node 120 further comprises one or more hardware devices 140 containing, e.g., a CPU, memory and the like, upon which the containers execute. The containers 138 are virtualized execution environments (where sets of instructions, also referred to as applications, are executed) that start up and spin down (e.g., terminated) on demand, as necessary, based on the requests from request broker 104.

In some aspects, the containers 138 may share all underlying resources of the hardware device 140, including its processor, memory, devices, and the like via the Operating System of the hardware device 140. However, the execution containers 138 each act as fully isolated environments in which individual applications are executed, secure from other applications and system configurations. The hardware device 140 may, in one aspect, be a server, which comprises a hypervisor or a software virtualization environment able to host many instances of virtual machines, or OS containers (e.g., Virtuozzo Containers™), or stateless containers (or even VMs, which may further each host multiple containers) or the like. Throughout this disclosure, all aspects of the systems and methods disclosed herein may apply to any kind of VEEs, containers, VMs, or the like.

The hardware node 121 further comprises a database 122, which may store references to containers on hardware node 120. In another aspect of the invention, the computing platform 102 may contain multiple hardware nodes each comprising their own sets of containers.

In one exemplary aspect when a client may be an IoT device such as IoT device 108, it may be preferred to offload some of the functionality to the computing platform 102 to execute some physical controls in response to events generated through coupled sensors 109. Meanwhile, the IoT device retains the ability to react in an agile manner to events generated by sensors 109 without significant delay in logic.

In one exemplary aspect, database 122 may store a plurality of Lambda events associated with Lambda functions to be executed on triggering of the events. The Lambda functions are generally associated with one or more containers 138. In one aspect, the database 122 contains a reference to the location of the containers 138 and returns this reference to the request broker 104.

Figure 1B:
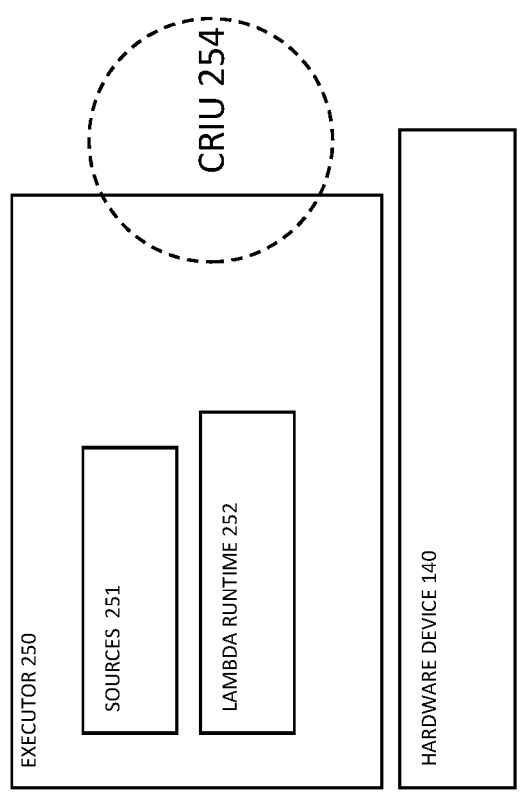
FIG. 1B illustrates the components of computing platform 102 according to an aspect of the disclosure

FIG. 1B illustrates the components of computing platform 102 according to an aspect of the disclosure. There is a hardware node (e.g. hardware node 120) with an executor 250. In one aspect, the executor 250 is a process that executes lambda code (in some aspects, executor comprises also an interpreter or a binary, i.e., compiled lambda code, with all needed libraries). The executor 250 may, in one aspect, be running in a virtual execution environment such as a container, or a virtual machine comprising a daemon, an SSH session, a stateless container, or the like. In one aspect of the disclosure, the executor 250 comprises an interpreter (a runtime environment for running instructions), e.g., interpreter 134, with a set of all needed libraries for executing the lambda sources 251. According to one aspect, the executor 250 further comprises an agent that communicates with the request broker (i.e., a scheduler) 104 and executes lambdas upon broker request. In some aspects of the disclosure, the agent executes as a daemon (i.e., a process that is launched and waits on a predetermined socket or sockets). In this aspect, the executor 250 also comprises a checkpoint component 254. In some aspects, the checkpoint component 254 may comprise checkpoint/restore in user space (CRIU) tool or any tool (or program, application, daemon, or a combination thereof, etc.), which is able to save the state of a process (or several processes, application, other component, module, etc.) in a snapshot, and to restore state of the process (or several processes, application, other component, module, etc.) from the snapshot. In one exemplary aspect of the disclosure, the checkpoint component 254 may create a snapshot (alternatively referred to as a checkpoint or a dump) of a state of the executor 250 and may restore the executor from a checkpoint. In another aspect, the checkpoint component 254 may create a snapshot of a state of a process of an application.

Figure 2A:
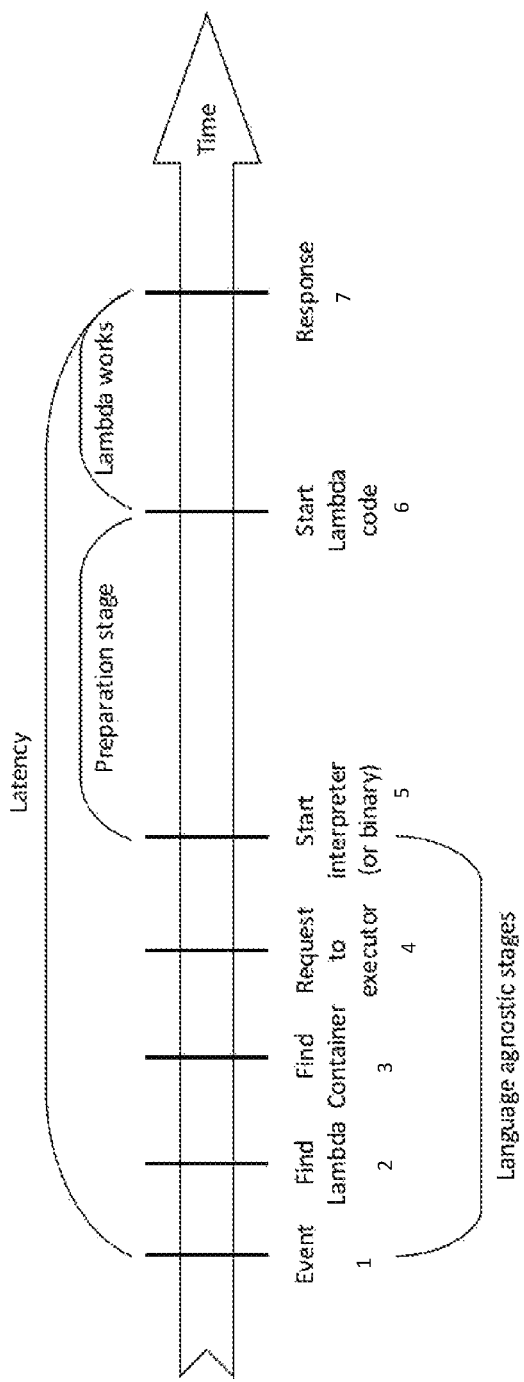
FIG. 2A illustrates the lambda processing timeline.

In some aspects, VEEs such as containers are created for executing Lambdas. In such aspects a checkpoint is created and the whole container (or any type of VEE) may be restored. In other aspects, there is a set of containers (or VMs, or any type of VEEs) ready for lambda execution. The lambda processing timeline is shown in FIG. 2A. In one example, at (1) an event is received and at (2) the Lambda associated with the received event is found. A container for the particular Lambda is found at (3). In this example, an execution request is made at time (4) to a Lambda executor (e.g., executor 250 of FIG. 1B) to execute the Lambda. Once the execution request is made, the interpreter (e.g., runtime environment, language runtime, or binary in the case of un-interpreted languages) is started at (5). The Lambda code is then started at (6) and once complete, a response is sent to the client at time (7). In one aspect of the disclosure, the response is sent to the client by transmitting the response to the request broker 104. The request broker 104 then transmits the response to the client. (1)-(5) are language-agnostic stages in that these steps occur regardless of the Lambda language (and regardless of whether the application is an interpreter or a binary). The preparation stage takes place between (5) and (6). The lambda begins execution at (6) and continues execution until (7). The aspects described in this disclosure reduce the length of the preparation stage, thus reducing the overall latency in returning a response to a client device.

Figure 2B:
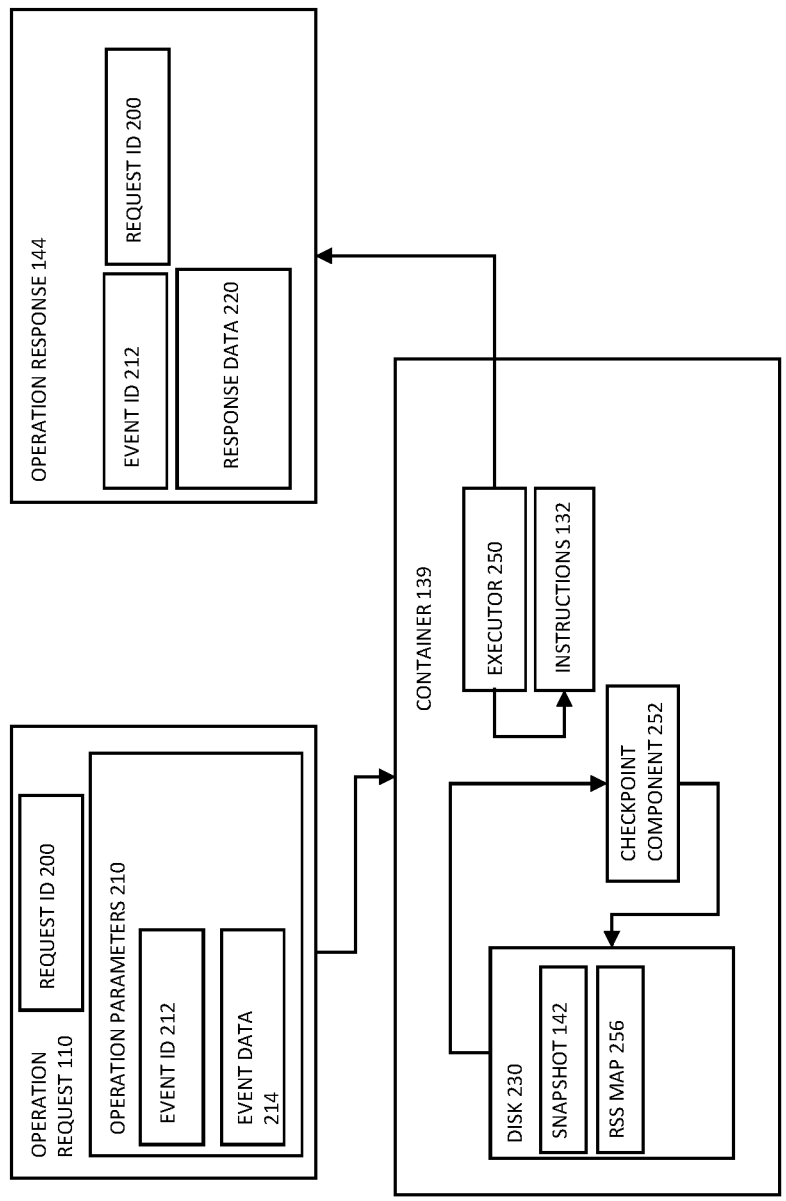
FIG. 2B illustrates a block diagram of the operation request, operation response and the container according to one aspect of the disclosure.

FIG. 2B illustrates an exemplary structure of operation request 110 according to one aspect of the disclosure. The operation request 110 comprises a request identifier (ID) 200 used for tracking of the request and operation parameters 210. The operation parameters 210 describe the event corresponds to the event ID 212 which is used to identify the instructions to execute in the computing platform 102. Additionally, the instructions generally require some data to operate on—this is provided via the event data 214 provided in the operation parameters 210. The event data 214 may contain sensor readings (e.g., for IoT clients), event occurrence or arrival time, or the like. According to one aspect of the disclosure, the operation request 110 may be an HTTP request, a CRON request, a bus message, or the like.

FIG. 2B also illustrates the components of the operation response 144 according to one aspect of the disclosure. The operation response 144 comprises the same request ID 200, the event ID 212 and response data 220. The response data 220 is the results of the execution of the instructions triggered by the event ID 212. Accordingly, once the computing platform 102 completes the operation request 110, an operation response 144 is returned to the clients. In one exemplary aspect, where the client device is the IoT device 108, the IoT device 108 may queue several requests, therefore the responses are tracked by comparing the request ID 200 in the operation response 144 to the request ID 200 sent in the operation request 110 so action can be taken by the IoT device 108 based on the response data 220. With a queue, the IoT device 108 does not have to wait on responses to operation requests before submitting new requests, but the responses can be properly correlated and business logic can be executed by the a client according to the response data 220.

In one exemplary aspect, the request broker 104 may listen for such requests as the operation request 110, and search for an appropriate container to execute the request by querying the database 122 of the hardware node 121. The request broker 104 determines which set of instructions 132 to execute based on the triggered event or in some aspects, the request broker 104 receives a request to execute a particular set of instructions (e.g., in some aspects, the request contains instructions such as "execute function X with given arguments Y"). In some aspects, each set of instructions 132 is associated with one or more events, e.g., with an event ID 212, while in some aspects multiple instructions 132 can be associated with the same event indicating that this event triggers multiple instructions. Upon receiving the request, the broker searches the place where the set of instructions will be executed. According to some aspects of the disclosure, each lambda function can be called by a user based on the lambda functions unique identifier (e.g., an alphanumeric identifier such as a name). Calls may be performed by sending a request to the broker, where the request contains instructions indicating to "execute function X with given arguments Y". Upon receiving the request, the broker 104 may then search for a location where the function X can be executed with arguments Y and launches one instance of the function at that location. Once the request broker 104 finds a running container (or starts a new container, executor, or restores a container from a snapshot, etc.) for the event, the request broker 104 issues a command to the container to execute the instructions corresponding to event (and event ID 212). In some instances, the database 122 may return several containers that can execute instructions by event ID 212. The request broker 104 can select a container based on round-robin implementations, or an optional load-balancer 105 is placed between the request broker 104 and the hardware node 121 which returns a container according to the load of each container from the database 122.

In one exemplary aspect, each container may be associated with a different set of instructions. In another aspect, there are one or more containers associated with one set of instructions 132. In yet another aspect, one set of instructions may be associated with one or more containers. The runtimes 136 are binary executables created from of instructions 132 that are in a compiled language. FIG. 2B illustrates a portion of the components of the container 139 including, for example, disk 230, the executor 250, the instructions 132 and the checkpoint component 252. The executor 250 is in communication with the request broker 104 and starts runtime 136 or asks interpreter to execute the instructions 132 (in other words, executes the application) on reception of a request from the request broker 104. The executor 250 runs, in some instances, as a daemon listening on a socket of the container 139. The checkpoint component (254) (which can be represented by "Checkpoint/Restore In User Space" (or, CRIU)) is a component as described above with reference to FIG. 1A that creates images (or snapshots) of a process (e.g., the container 139, interpreter or processes of runtime) at particular points in time as described below with respect to FIGS. 3-6, saves the snapshots on disk 230 as snapshot 142 and restores the state of the process from snapshot 142 on disk 230. In some aspects, the checkpoint component 252 (e.g., CRIU) also creates a resident set size (RSS) map 256 as described further below, in order to support lazy restore operations. The disk 230 represents a portion of the disk of hardware device 140 (or a virtual device) allotted to the container 139.

If the set of instructions 132 (e.g., a Lambda) is written in an interpreted language such as Java, a container that is selected by the request broker 104 begins execution of an interpreter 134 (e.g., a JAVA virtual machine) to execute the instructions 132. Once the instructions are executed, a response is created and returned (e.g., by the request broker 104) as operation response 144 to a client (e.g., client 103-108). Specifically, the result of the instructions 132 are included in response data 220. In one example, the instructions 132 are a compiled binary (e.g., a set of source code was compiled to generate an executable binary file), the binary is executed and the response is returned as operation response 144.

Figure 3:
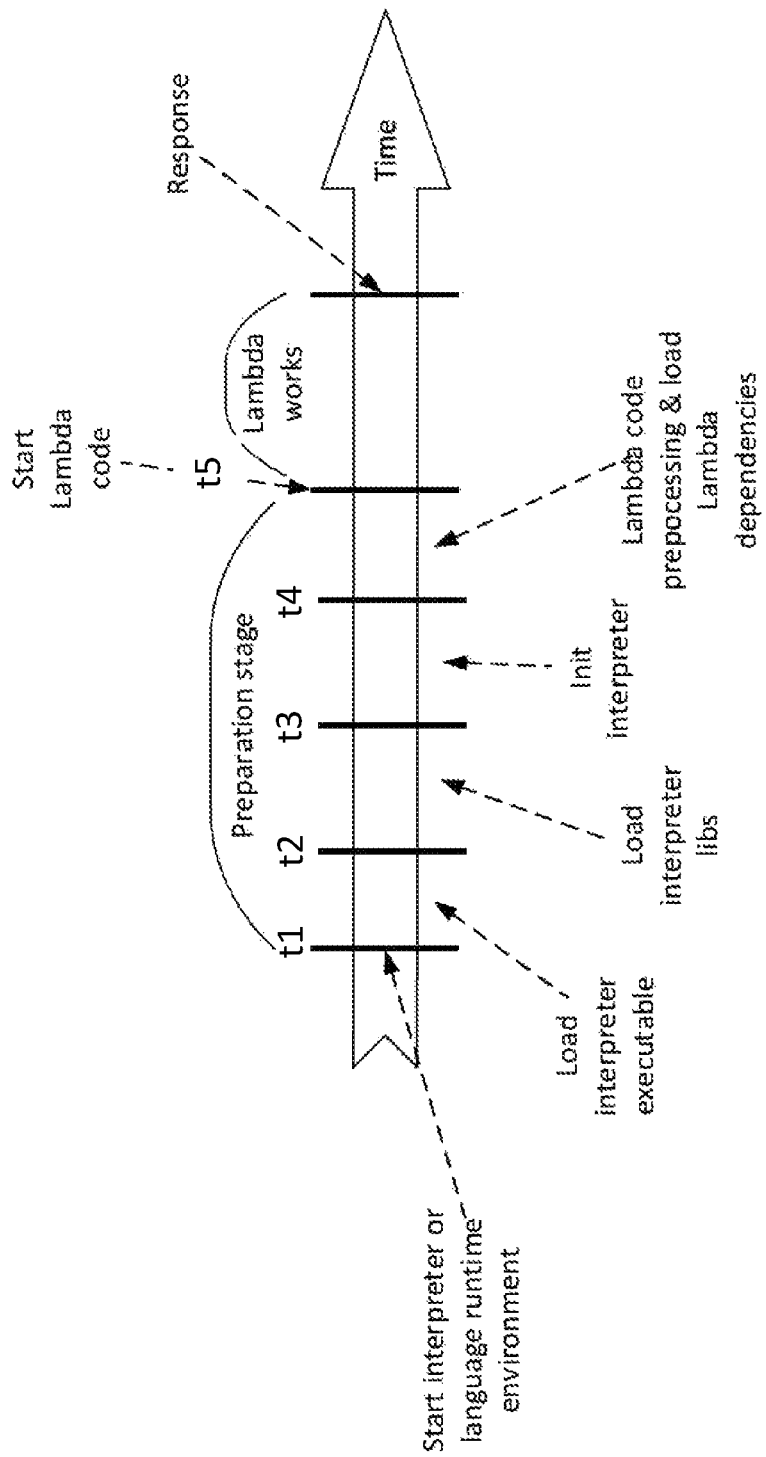
FIGS. 3-6 illustrate a timeline of execution of an interpreter or binary in a container according to one aspect of the disclosure.

FIG. 3 outlines the preparation stage of executing a Lambda in accordance with an aspect of the present disclosure. The Preparation stage starts at t1 when the interpreter 134 is started, and Lambda code is started after the preparation stage ends at time t5.

During the preparation stage, the interpreter executable is loaded (e.g. Java VM or executable of Python interpreter, or the like) at time t1. At time t2, interpreter libraries are loaded. The libraries are libraries that the interpreter needs. For example, the Python interpreter often needs "glibc". The interpreter is initialized from time t3 to t4.

Lambda code preprocessing and loading Lambda dependencies occurs from time t4 until time t5. In one aspect, Lambda code is analyzed for syntax errors, and/or the Lambda code may be precompiled during the time t4 to t5. In addition, the Lambda's dependencies are loaded (those that are needed particularly by the Lambda code) during t4 to t5. After the preparation stage is completed, Lambda code is started at time t5.

Figure 4:
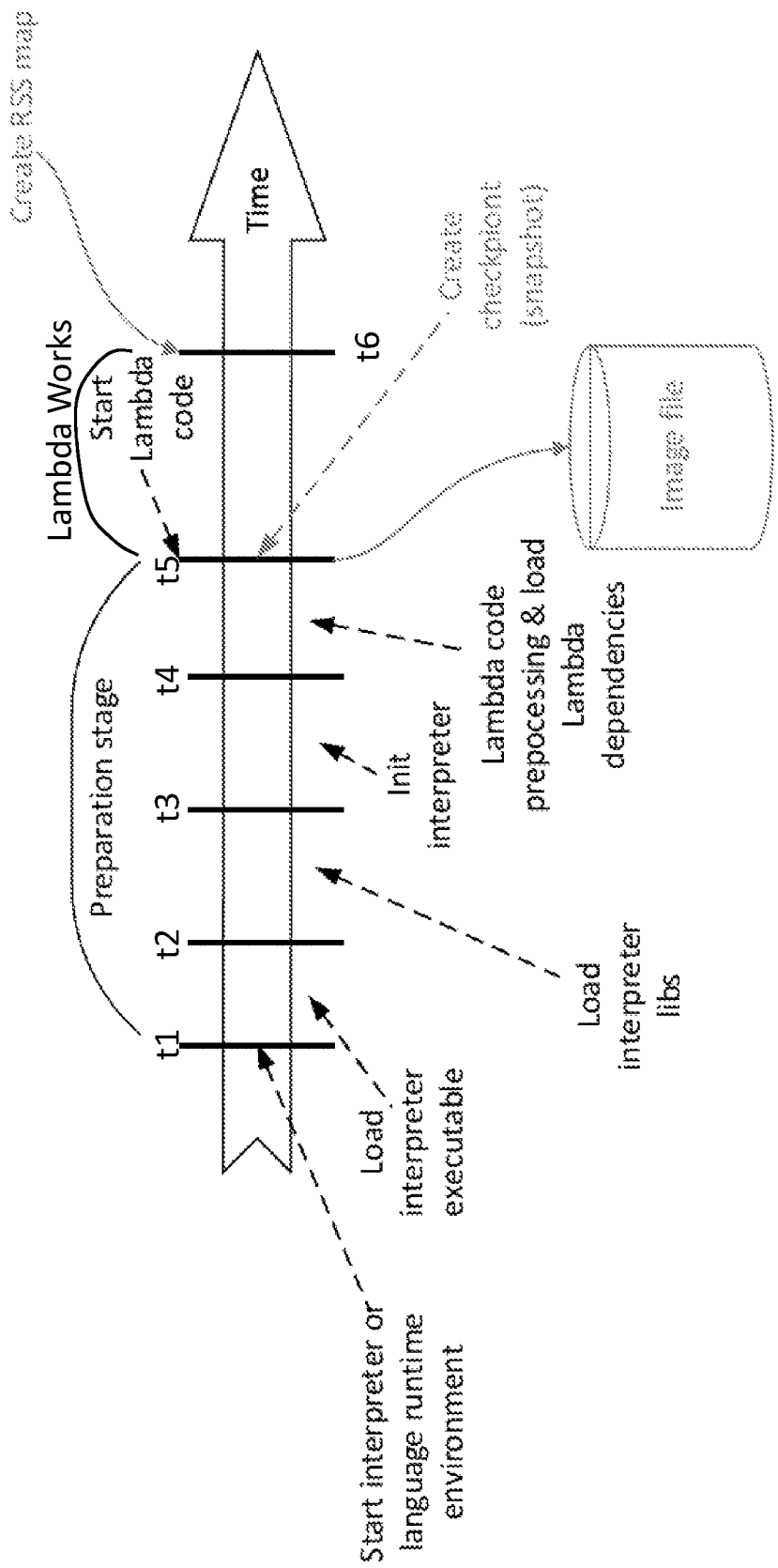

FIG. 4 illustrates a timeline of the creation of a checkpoint (e.g., a snapshot). In one exemplary sequence of events, container 139 has been selected by the request broker 104. The preparation stage begins at time t1 and ends at time t5. The interpreter 134 then executes the instructions 132 at time t5 until t6, after which a response is returned to the clients (e.g., by the request broker 104).

Figure 5:
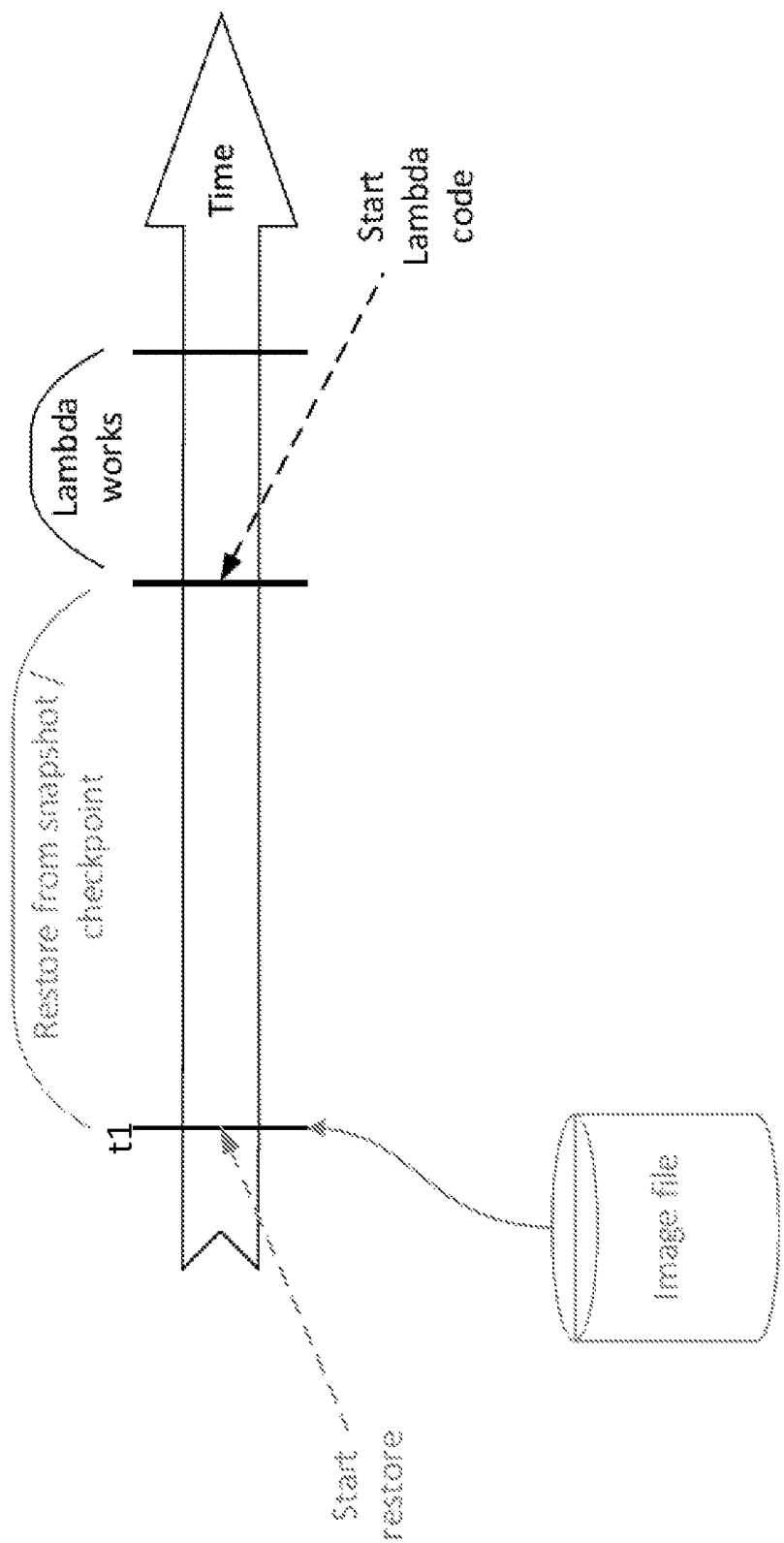

In one aspect of the disclosure shown in FIG. 5, instead of performing the preparation stage from t1 to t5, at time t1 the checkpoint component 252 performs a restore from checkpoint (e.g., from a snapshot saved on disk 230) and then the Lambda instructions are executed in the restored execution environment.

Otherwise, after performing the preparation stage from t1 to t5, just before starting the Lambda code execution, a checkpoint (e.g. a snapshot of a container, or a checkpoint of the state of the interpreter) may be created at t5 by the checkpoint component 252, which is then stored by the checkpoint component 252 as an image file on disk (e.g. snapshot 142 on disk 230). In one aspect, the state of the interpreter includes states of processes that the interpreter relies on for execution.

Lambdas can be written in many different languages and platforms (e.g. Java, Python, Node.js, Ruby, .net, Lisp, Closure, VB, etc.). In the case of un-interpreted languages (e.g. Lambda code is written in a compiled language), an interpreter is not needed so a binary is loaded as shown in FIG. 2A and then the preparation stage is performed. In the case of a binary, binary dependencies are loaded. The runtime environment for running this binary, and all needed libraries are loaded. After the preparation stage is complete, the code of the Lambda is started at t5 (e.g., as shown in FIG. 4). For example, if the source code of the binary is written in C++, then calling of the function entry point will be the checkpoint. In other words, once the main code of the Lambda (e.g., its entry point) is about to begin execution, the state of the process (or processes used for Lambda execution) is saved into an image.

When this is the first time the container 139 is starting the interpreter (for a particular set of instructions), the preparation stage lasts a significant amount of time. Thereafter, the container 139 or portions thereof are restored by the checkpoint/restoration scheme performed by the checkpoint component 252, thus reducing or eliminating the delay entirely. In another aspect, the snapshots are created for prepared containers ahead of execution of any instructions, therefore the preparation stage delay is never experienced by a consumer such as the clients 103, 106 and 108.

At time t1 when the interpreter is started, the interpreter may initialize randomization (e.g. if randomization is needed for the Lambda). If the interpreter (e.g. interpreter 134) is restored from a checkpoint, its randomizer may also be restored and will become non-random, an undesirable result. Therefore, in one aspect of the disclosure, after restoring from the checkpoint at time t1 in FIG. 5, the checkpoint component 252 either reinitializes or reseeds all random number generators. In one aspect, it is observed that reseeding is faster than re-initialization and re-initialization is performed only when reseeding is not possible. Some subsystems that operate with random temporary data allow simple re-seeding, i.e. re-generating a small amount of data. For example, a pseudo-random number generator needs only 4 (or 8) bytes re-generated to start generating a new pseudo-random sequence. Some subsystems, e.g. authentication modules, may need to re-initialize more components that in many cases cannot be achieved by simply re-generating several bytes. In these cases it is more desirable (or only possible) to fully re-initialize the subsystem in question instead of re-generating several bytes.

In one aspect, during the preparation stage the interpreter 134 may perform many different actions. If the interpreter is started twice in the same environment, the interpreter 134 may perform some actions in the same manner and get entirely the same result (e.g. loading libraries, and the like). However some actions will provide the different results. In other words, these actions may be initialized using different values. For example, initializing a random number generator, session identifiers, cookies, or the like can produce different results every time they are initialized. Such actions are "unrepeatable" or "unique" in a sense because their result will not be the same each time the executor 250 executes the Lambda.

Accordingly, in this aspect of the disclosure, after restoring the interpreter state from checkpoint at time t1 in FIG. 5, values affected by such "unrepeatable" or "unique" actions may be checked and possibly reinitialized. For example, a random number generator may be re-seeded.

In one aspect of the restore operation at time t1 in FIG. 5, the checkpoint component 252 restores the entire state of the interpreter from the image file (e.g. snapshot 142 stored on disk 230). In other words, the checkpoint component 252 maps the data from snapshot 142 to memory immediately.

There also are varying ways that the checkpoint component 252 can perform the lazy restore, though other methods are also contemplated by the present disclosure. The present disclosure is not limited to the following methods of performing the lazy restore.

According to another aspect of the disclosure, restore time can be further reduced during the restore operation by implementing a lazy restore (or RSS).

A snapshot may contain two types of data: kernel objects and process memory (e.g., memory of all processes of a container, an interpreter, a virtual machine, lite VM or any virtual execution environment). When a "whole" restore is performed by the checkpoint component 252, everything is restored from the snapshot, i.e., kernel objects and process memory. In a lazy restore, only kernel objects are restored by the checkpoint component 252. In another aspect of the disclosure, kernel objects are restored along with a portion of memory pages. The portion of memory pages include those that were used by some particular lambda during its execution (e.g., pages mentioned, or stored, in RSS map 256).

In another aspect, a restore of the entire memory is performed. In one example, the interpreter memory is restored. Additionally, in one aspect of lazy restore, only those memory pages that are needed at the moment are restored, and other memory pages are restored by the checkpoint component 252 only when there is an attempt to access to them. Then the restoration stage will be performed quickly by checkpoint component 252, increasing the efficiency of the hardware device 140.

According to one aspect, a lazy restore describes a process being restored by the checkpoint component 254 with various portions of its memory (or even without them), and the component 254 maps missing regions on-demand. For example, a process may be restored without any of its memory, or alternatively a process may be restored only with some "hot" parts of memory (e.g., particularly identified portions, via RSS for example). In another aspect, a process may be mostly restored, excluding some "cold" parts (e.g., memory particularly identified as not being needed or used). For example, in one aspect, the executor 250 may be restored without some portions of its memory. The executor 250 continues execution and when (or, if) the executor 250 needs the excluded portions of memory, the executor 250 is stopped, the excluded memory is mapped in, and the execution continues.

In another aspect of the disclosure, a lazy restore operation is performed in which the checkpoint component 252 restores only a portion of memory of the process. In FIG. 4 a checkpoint (e.g., an image file) is created by the checkpoint component 252 at t5, just before starting the Lambda code. After the executor 250 stops executing the Lambda code, the checkpoint component 252 creates a Residence Set Size (RSS) map (e.g. RSS map 256). The RSS map is a record (e.g., a list of pages, etc.) of exact memory pages that the Lambda code used during execution. According to this aspect of lazy restore, the RSS map will be used to reduce the duration of the restoring operation. Then, during a restore operation, the checkpoint component 252 compares data (e.g., data about which pages have been used) in the image file (i.e., identifying which pages are there) and in the RSS map. Only pages that are present in both the image file and in the RSS map are restored immediately by the checkpoint component 252. All other pages will be restored only after attempt to access those pages. In other words, a lazy restore is performed by the checkpoint component 252 by only restoring pages once they are accessed by the Lambda.

In one aspect, tracking memory access using "UserFaultFD" may be used for lazy restore. In other words, the checkpoint component 252 tracks all attempts to access un-present pages and loads corresponding pages from the image file (e.g., snapshot 142).

In another aspect, lazy restore can operate as follows. The checkpoint component 252 maps the image file (snapshot 142) to memory. Then if there is an attempt to access this memory, the page will be loaded from disk by the checkpoint component 252. This second aspect is significantly faster than tracking memory access. The memory range before performing the checkpoint was previously anonymous and after the lazy restore the memory range will be assigned to a memory mapped file (i.e. image file). Generally, Lambdas are not impacted by the mapping because they are written in high-level programming languages and perform particular tasks that are completed quickly.

Figure 6:
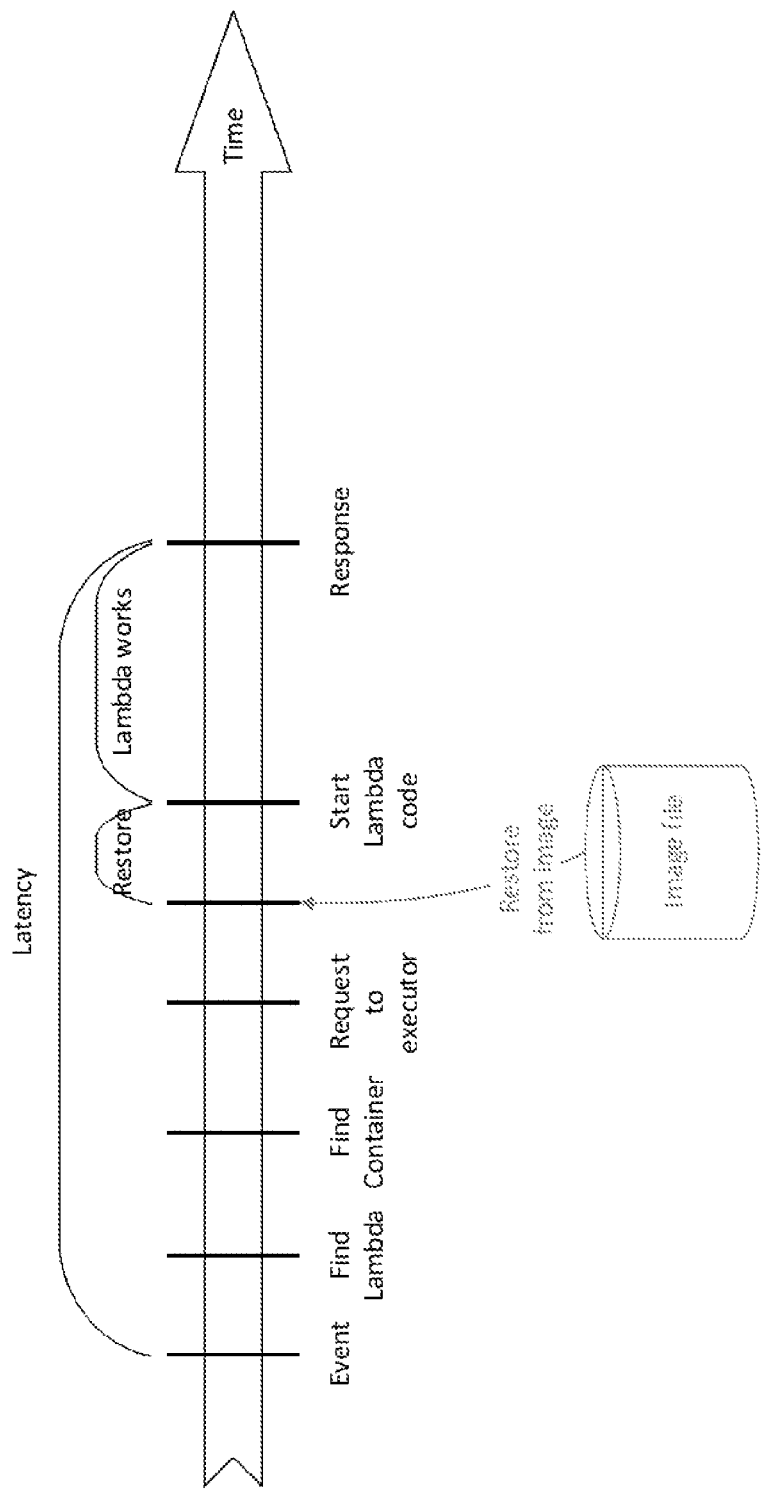

FIG. 6 is an overview of the entire process depicting the various stages from event trigger, to restoring an image file by the checkpoint component 252, to the lambda being executed by the executor 250 and a response being returned to a client device. Restoring as described above saves a significant amount of time and significantly reduces the latency from event trigger to response to the client. Even a small (e.g., microsecond) improvement in execution of each set of instructions 132 leads to significant improvement for a cluster of containers or machines executing hundreds of instructions, freeing up hardware resources.

Figure 7:
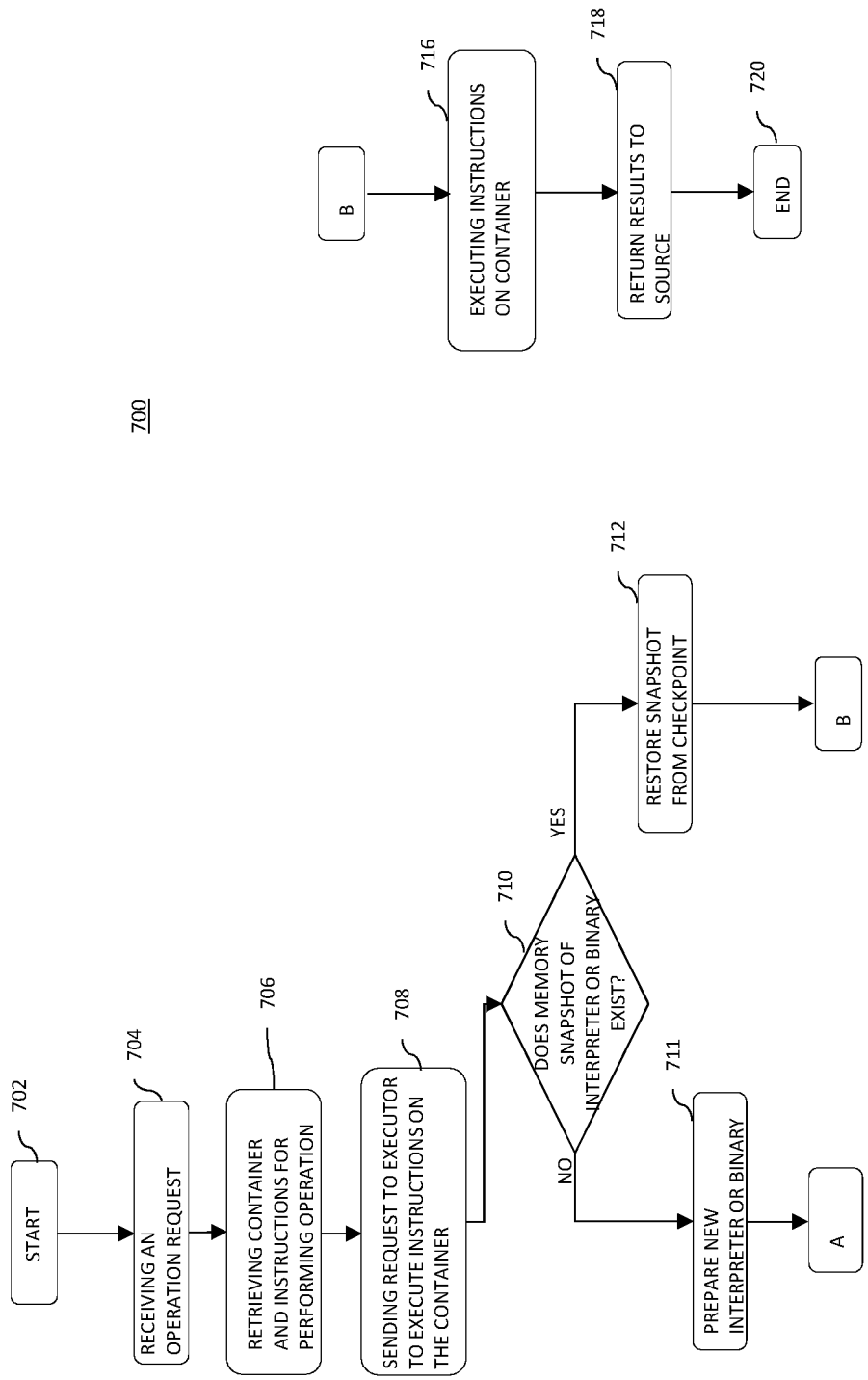
FIGS. 7-8 illustrate a flowchart of methods reducing cost overhead in using execution containers according to one aspect of the disclosure.

FIG. 7 illustrates a flowchart of a method 700 for improving functionality of execution containers according to one aspect of the disclosure.

Portions of the computing platform 102 are exemplary implementations of the method 700 as executed by the processor 21 in computer system 20, in some aspects of the present disclosure.

The method 700 begins step 702 and proceeds to 704. At step 704, the request broker 104 receives operation request 110 containing an event ID 212 and event data 214. In another aspect, an event is triggered at the request broker 104.

The method proceeds to 706 where, based on the event (e.g., using event ID 212), instructions associated with the event are determined, and a container (or any other execution environment, or a hardware node, or an executor 250) associated with the instructions are retrieved from database 122 of hardware node 121. In some aspects, retrieval of the containers from the hardware node 121 are performed using load balancer 105 based on resource availability.

At 708, the request broker sends a request to the executor 250 on the retrieved container (e.g. container 139), to begin execution of the set of instructions. The container 139 was started at request of the broker 104.

Figure 8:
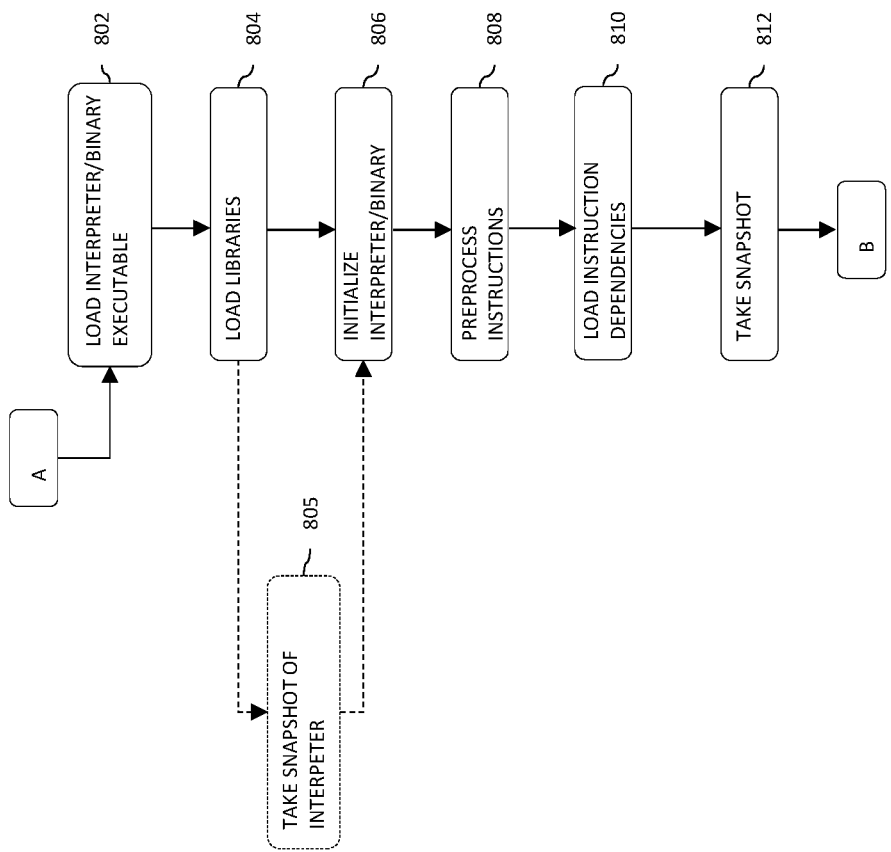

At 710, the checkpoint component 252 of the container 139 determines whether a state snapshot of the interpreter or of the application (or even a state of the virtual environment, in some aspects) exists. If at step 710 the state snapshot does not exist, the method 700 proceeds to 714 where preparation of a new instance of an interpreter or binary begins. Subsequently after 714, the method proceeds to method portion A as illustrated in FIG. 8 and described below.

If the state snapshot does exist, at step 712, a state of the interpreter is restored from a snapshot and the method proceeds to method portion B. In some aspects, as described above with respect to FIGS. 3-6, the checkpoint component 252 may perform a lazy restore that may or may not perform snapshot restores with the use of an RSS map. Method portion B begins at 716 where the executor 250 executes the set of instructions. Then result is send to client (e.g., transmitted by broker).

Method portion A moves to 802 where the interpreter is loaded for interpreted languages, or a binary is loaded for compiled languages by the container 139. At 804, the library dependencies for the interpreter or binaries are loaded by the container 139.

In some embodiments as described with respect to FIG. 5-6, the checkpoint component 252 may take a snapshot of the state of the interpreter at 805.

The method proceeds to 806 where the interpreter or binary is initialized in that particular variables or values that need to be set for the instructions 132 to execute are set and ready for execution of the instructions 132.

At 808, the executor 250 performs any preprocessing for the instructions 132 and at 810, any dependencies the instructions might have are loaded. Finally, according to one aspect, at step 812, the checkpoint component 252 performs a snapshot of the fully initialized interpreter, so it can be restored at a later execution of the same set of instructions 132, saving the container 139 from executing steps 802-812 repeatedly, conserving resources of the underlying hardware device 140. The method then returns to method portion B shown in FIG. 7 where at 716, the instructions are executed by the executor 250 on the container 139.

The results of the instructions 132 being executed are then returned to the request broker 104, which returns the results to a client (e.g., devices 103-108) as operation response 144. After the executor 250 returns the results, the container is then returned to the pool of containers in the hardware node 120 or discarded. The method 700 ends at 720.

Figure 9:
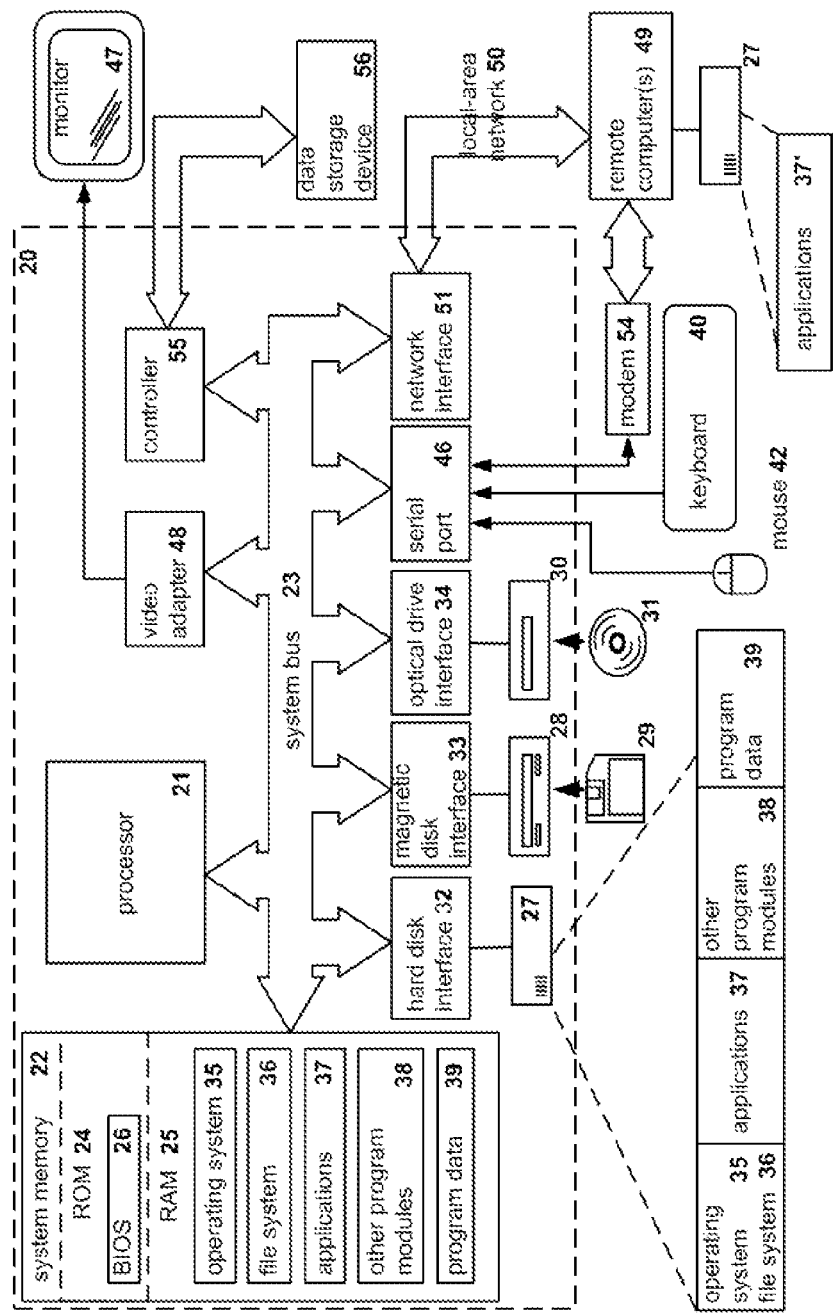
FIG. 9 illustrates a block diagram of a general-purpose computer system on which the disclosed system and method can be implemented according to an exemplary aspect.

FIG. 9 illustrates a block diagram of a general-purpose computer system on which the disclosed system and method can be implemented according to an exemplary aspect. It should be noted that the computer system 20 can correspond to the system 100, computing platform 102, hardware nodes 120 and 121, hardware device 140 and client devices 103-108, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for execution of applications in a virtual execution environment, comprising:
    receiving from a client, a request for execution of an application in at least one virtual execution environment on at least one hardware node, wherein the application includes a set of instructions for processing the request along with an interpreter configured to execute the set of instructions;
    determining whether there is a state snapshot of the application in the virtual execution environment, wherein the state snapshot includes kernel objects and process memory stored as an image file on disk storage;
    restoring a state of the application from the state snapshot in the virtual execution environment when the state snapshot of the application is found, wherein a portion of data from the image file is written to a memory of the application only when the application attempts to access information stored in the portion of data;
    starting the application without restoring the state of the application from the state snapshot and creating a new state snapshot of the application when the state snapshot of the application is not found, wherein creating the new state snapshot is performed after initializing the interpreter and before execution of the set of instructions by the interpreter;
    continuing execution of the application in the virtual execution environment and execution of the set of instructions by the interpreter; and
    returning a response of the application to the client, wherein the virtual execution environment is an execution container.

2. The method of claim 1, wherein starting the application without restoring the state of the application from the state snapshot further comprises:
    preparing the application for processing the request;
    and, wherein continuing execution of the application in the virtual execution environment further comprises processing the request by the application.

3. The method of claim 2, wherein preparing the application further comprising at least one of:
    loading application executables,
    loading application dependencies,
    initializing variables of the application,
    performing code preprocessing.

4. The method of claim 1,
    wherein initializing the interpreter further includes initializing one or more variables of the interpreter; and
    wherein restoring the state of the application from the state snapshot includes re-initializing at least one of the one or more variables of the interpreter already initialized in the state snapshot.

5. The method of claim 4, wherein, when the application comprises an interpreter, re-initializing comprises re-seeding random number generators already instantiated by the interpreter in the state snapshot.

6. The method of claim 1, wherein the application is one of:
    a set of instructions written in an interpreted language along with an interpreter configured to execute the set of instructions; or
    a precompiled binary created from the set of instructions.

7. The method of claim 1, wherein the restoring the state of the application from the state snapshot further comprises:
    loading at least one page from the image file to memory associated with the application,
    restoring of at least one kernel object of at least one process associated with the application.

8. The method of claim 1, further comprising:
    during execution of the application, inspecting a memory of the application and creating a map indicating which pages of the memory have been accessed;
    during later restoration of the state of the application, comparing pages in the image file to pages in the map, wherein the portion of data from the image file that is written to the memory of the application corresponds to pages in both the image file and the map; and
    writing other portions from the image file to the memory of the application only after the application attempts to access information stored in the other portions.

9. A system for execution of applications in a virtual execution environment comprising:
    a hardware processor configured to:
        receive from a client, a request for execution of an application in at least one virtual execution environment on at least one hardware node, wherein the application includes a set of instructions for processing the request along with an interpreter configured to execute the set of instructions;
        determine whether there is a state snapshot of an application in the virtual execution environment, wherein the state snapshot includes kernel objects and process memory stored as an image file on disk storage;
        restore a state of the application from the state snapshot in the virtual execution environment when the state snapshot of the application is found, wherein a portion of data from the image file is written to a memory of the application only when the application attempts to access information stored in the portion of data;
        start the application without restoring the state of the application from the state snapshot and creating a new state snapshot of the application when the state snapshot of the application is not found, wherein creating the new state snapshot is performed after initializing the interpreter and before execution of the set of instructions by the interpreter;

continue execution of the application in the virtual execution environment and execution of the set of instructions by the interpreter; and return a response of the application to the client, wherein the virtual execution environment is an execution container.

10. The system of claim 9, wherein starting the application without restoring the state of the application from the state snapshot further comprises:
preparing the application for processing the request; and, wherein continuing execution of the application in the virtual execution environment further comprises processing the request by the application.

11. The system of claim 10, wherein preparing the application further comprising at least one of:
loading application executables,
loading application dependencies,
initializing variables of the application,
performing code preprocessing.

12. The system of claim 9,
wherein initializing the interpreter further includes initializing one or more variables of the interpreter; and
wherein restoring the state of the application from the state snapshot includes re-initializing at least one of the one or more variables of the interpreter already initialized in the state snapshot.

13. The system of claim 12, wherein, when the application comprises an interpreter, re-initializing comprises re-seeding random number generators already instantiated by the interpreter in the state snapshot.

14. The system of claim 9, wherein the application is one of:
a set of instructions written in an interpreted language along with an interpreter configured to execute the set of instructions; or
a precompiled binary created from the set of instructions.

15. The system of claim 9, wherein the restoring the state of the application from the state snapshot further comprises:
loading at least one page from the image file to memory associated with the application,
restoring of at least one kernel object of at least one process associated with the application.

16. The system of claim 9, wherein the hardware processor is further configured to:
during execution of the application, inspect a memory of the application and creating a map indicating which pages of the memory have been accessed;
during later restoration of the state of the application, compare pages in the image file to pages in the map, wherein the portion of data from the image file that is written to the memory of the application corresponds to pages in both the image file and the map; and
write other portions from the image file to the memory of the application only after the application attempts to access information stored in the other portions.

17. A non-transitory computer-readable medium storing instructions thereon for execution of applications in a virtual execution environment, the instructions comprising:
receiving from a client, a request for execution of an application in at least one virtual execution environment on at least one hardware node, wherein the application includes a set of instructions for processing the request along with an interpreter configured to execute the set of instructions;
determining whether there is a state snapshot of an application in the virtual execution environment, wherein the state snapshot includes kernel objects and process memory stored as an image file on disk storage;
restoring a state of the application from the state snapshot in the virtual execution environment when the state snapshot of the application is found, wherein a portion of data from the image file is written to a memory of the application only when the application attempts to access information stored in the portion of data;
starting the application without restoring the state of the application from the state snapshot and creating a new state snapshot of the application when the state snapshot of the application is not found, wherein creating the new state snapshot is performed after initializing the interpreter and before execution of the set of instructions by the interpreter;
continuing execution of the application in the virtual execution environment and execution of the set of instructions by the interpreter; and
returning a response of the application to the client, wherein the virtual execution environment is an execution container.

18. The non-transitory computer-readable medium of claim 17, wherein starting the application without restoring the state of the application from the state snapshot further comprises:
preparing the application for processing client request, which comprises at least one of:
loading application executables;
loading application dependencies;
initializing variables of the application; or
performing code preprocessing,
wherein continuing execution of the application in the virtual execution environment further comprises:
processing the client request by the application, and
wherein the application is one of: a set of instructions written in an interpreted language along with an interpreter configured to execute the set of instructions or a precompiled binary created from the set of instructions.

19. The non-transitory computer-readable medium of claim 17,
wherein initializing the interpreter further includes initializing one or more variables of the interpreter; and
wherein the restoring the state of the application from the state snapshot further comprises:
loading at least one page from the image file to memory associated with the application;
restoring of at least one kernel object of at least one process associated with the application; and
at least one of the one or more variables of the interpreter already initialized in the state snapshot.

20. The non-transitory computer-readable medium of claim 17, the instructions further comprising:
during execution of the application, inspecting a memory of the application and creating a map indicating which pages of the memory have been accessed; and
during later restoration of the state of the application, comparing pages in the image file to pages in the map, wherein the portion of data from the image file that is written to the memory of the application corresponds to pages in both the image file and the map.

21. The method of claim 1, wherein the writing to the memory of the application includes stopping the execution of the application attempting access to the information and indicating pages of the memory being accessed during the attempt in a map.

* * * * *